(12) United States Patent
Matsuda et al.

(10) Patent No.: US 12,523,624 B2
(45) Date of Patent: Jan. 13, 2026

(54) PEAK IDENTIFICATION ANALYSIS PROGRAM, AND X-RAY FLUORESCENT SPECTROMETER

(71) Applicant: Rigaku Corporation, Akishima (JP)

(72) Inventors: Wataru Matsuda, Takatsuki (JP); Yoshiyuki Kataoka, Takatsuki (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 18/695,001

(22) PCT Filed: Jul. 8, 2022

(86) PCT No.: PCT/JP2022/027113
§ 371 (c)(1),
(2) Date: Mar. 25, 2024

(87) PCT Pub. No.: WO2023/074056
PCT Pub. Date: May 4, 2023

(65) Prior Publication Data
US 2024/0337612 A1 Oct. 10, 2024

(30) Foreign Application Priority Data
Oct. 28, 2021 (JP) ................................. 2021-176268

(51) Int. Cl.
*G01N 23/22* (2018.01)
*G01N 23/223* (2006.01)
(52) U.S. Cl.
CPC ................................. *G01N 23/223* (2013.01)
(58) Field of Classification Search
CPC .................................................. G01N 23/223
See application file for complete search history.

(56) References Cited

U.S. PATENT DOCUMENTS 7,450,685 B2 * 11/2008 Kataoka ............. G01N 23/2209
378/50
10,768,125 B2 * 9/2020 Kato .................... G01N 23/223
(Continued)

FOREIGN PATENT DOCUMENTS

EP 0014580 A1 8/1980
JP H01-319239 A 12/1989
(Continued)

OTHER PUBLICATIONS

X-ray Fluorescence SRF Spectrometer, 2024.*
(Continued)

*Primary Examiner* — Lina Cordero
*Assistant Examiner* — Lynda Dinh
(74) *Attorney, Agent, or Firm* — HEA Law PLLC (57) ABSTRACT

To enable identification analysis of a fluorescent X-ray spectrum and verification of an analysis result to be easily performed, provided is a storage medium for storing a peak identification analysis program for causing a computer used for an X-ray fluorescence spectrometer. The program causes the computer to execute: a first list display step of displaying a list of elements and line types that are identified based on a designated angle or energy, as a first list; a first list reception step of receiving designation of elements and line types included in the first list; and a display update step of displaying, in a state where the first list is displayed, while showing that an element and a line type designated in the first list have been designated, a list of the designated element and line type and an angle or energy at which another line type of the designated element appears, as a second list.

7 Claims, 10 Drawing Sheets

(56) References Cited

U.S. PATENT DOCUMENTS

| | | | |
|---|---|---|---|
| 2005/0019946 A1* | 1/2005 | Tuchman | G01N 21/3563 |
| | | | 436/171 |
| 2018/0150616 A1* | 5/2018 | Akamaru | G01N 33/02 |
| 2018/0180563 A1* | 6/2018 | Hara | G01N 23/223 |
| 2019/0072504 A1* | 3/2019 | Kato | G01N 23/223 |

FOREIGN PATENT DOCUMENTS

| | | | |
|---|---|---|---|
| JP | H04-343051 A | | 11/1992 |
| JP | 2000105207 A | | 4/2000 |
| JP | 2005-114658 | * | 4/2005 |
| JP | 2005-114658 A | | 4/2005 |
| JP | 4255012 B2 | | 4/2009 |
| JP | 2018-087700 A | | 6/2018 |
| JP | 2020-201148 A | | 12/2020 |
| WO | 2021079184 A1 | | 4/2021 |

OTHER PUBLICATIONS

International Search Report of Sep. 6, 2022 for International Patent Application No. PCT/JP2022/027113 with English translation, pp. 1-4.

Search Report of Sep. 2, 2024, for corresponding EP Patent Application No. 22886393.2, pp. 1-7.

* cited by examiner

LINE TYPE SEARCH — 402

DESIGNATED ANGLE: 34.00     [ SEARCH ]—404

SEARCH RESULTS

| | ELEMENT AND LINE TYPE | 2θ ANGLE (deg) | RELATIVE INTENSITY |
|---|---|---|---|
| ■ | Pb Lα | 33.915 | 100.0 |
| ☐ | Re Lβ5 | 33.980 | 0.1 |
| ■ | As Kα | 33.980 | 150.0 |

—406

LINE TYPE OF SELECTED ELEMENT

| | ELEMENT AND LINE TYPE | 2θ ANGLE (deg) | RELATIVE INTENSITY |
|---|---|---|---|
| ■ | Pb Lβ1 | 28.2400 | 50.0 |
| ■ | Pb Lα | 33.9150 | 100.0 |
| ☐ | As Kβ1 | 30.4300 | 30.0 |
| ☐ | As Kα | 33.9800 | 150.0 |

—408

410—[ OK ]  [ CANCEL ]

| ELEMENT AND LINE TYPE | 2θ ANGLE (deg) | RELATIVE INTENSITY |
|---|---|---|
| Pb Lα | 33.915 | 100.0 |
| Re Lβ5 | 33.980 | 0.1 |
| As Kα | 33.980 | 150.0 |

| ELEMENT AND LINE TYPE | 2θ ANGLE (deg) | RELATIVE INTENSITY |
|---|---|---|
| Pb Lβ1 | 28.240 | 50.0 |
| Pb Lα | 33.915 | 100.0 |

| ELEMENT AND LINE TYPE | 2θ ANGLE (deg) | RELATIVE INTENSITY |
|---|---|---|
| As Kβ1 | 30.430 | 30.0 |
| As Kα | 33.980 | 150.0 |

PEAK IDENTIFICATION ANALYSIS PROGRAM, AND X-RAY FLUORESCENT SPECTROMETER

CROSS REFERENCE TO RELATED APPLICATIONS

This application is a National Stage of International Application No. PCT/JP2022/027113 filed on Jul. 8, 2022, which claims priority from Japanese Patent Application 2021-176268, filed on Oct. 28, 2021. The contents of the above document are incorporated herein by reference in its entirety.

TECHNICAL FIELD

The present invention relates to a peak identification analysis program and an X-ray fluorescence spectrometer.

BACKGROUND ART

As an instrument for measuring an element contained in a sample and a concentration of the element, there has been known an X-ray fluorescence spectrometer which analyzes an element and the like contained in a sample based on fluorescent X-rays emitted when the sample is irradiated with primary X-rays.

There are a wavelength-dispersive X-ray fluorescence spectrometer and an energy-dispersive X-ray fluorescence spectrometer as types of X-ray fluorescence spectrometers. The wavelength-dispersive X-ray fluorescence spectrometer acquires a fluorescent X-ray spectrum in which the horizontal axis represents a $2\theta$ angle (hereinafter also simply referred to as "angle") and the vertical axis represents an intensity of the fluorescent X-rays, where $\theta$ represents an incident angle at which the fluorescent X-rays enter a spectroscopic device. The energy-dispersive X-ray fluorescence spectrometer acquires a fluorescent X-ray spectrum in which the horizontal axis represents energy of the fluorescent X-rays and the vertical axis represents the intensity of the fluorescent X-rays. A peak included in the fluorescent X-ray spectrum is identified based on an angle or energy at which the peak appears and an intensity of the peak.

As an example of an identification method that has been hitherto performed, a method of identifying a peak included in the fluorescent X-ray spectrum acquired by the wavelength-dispersive X-ray fluorescence spectrometer is described below.

First, in a heavy element region of the fluorescent X-ray spectrum (Ti and the subsequent elements in the periodic table of elements), peaks of Thomson (or Rayleigh) scattered rays and Compton scattered rays, which are rays scattered of characteristic X-rays from an X-ray tube target element (for example, Rh), are examined (Step 1).

Subsequently, a peak having a high intensity other than those of the scattered rays included in the fluorescent X-ray spectrum is selected. Among the fluorescent X-rays that appear in a predetermined angular range including an angle of the selected peak, candidates of a K$\alpha$ line, an L$\alpha$ line, and an L$\beta$1 line, which are types of lines having a high intensity, are selected (Step 2). The phrase "line type" may represent an element symbol (for example, "Pb" of PbL$\beta$1 line) and a symbol determined by shells and orbitals of the source and destination of electron transitions (for example, "L$\beta$1" of PbL$\beta$1), but in the following, mainly represents only the latter symbol determined by the shells and orbitals of the source and destination of electron transitions.

It is examined whether a peak exhibited by a line type that forms a pair with the line type selected as the candidate in Step 2 appears. The line type that forms a pair in this case is another line type emitted owing to an element that emits the line type selected as the candidate. For example, the line type that forms a pair is a K$\beta$ line when the line type included in the candidates is the K$\alpha$ line, is the L$\beta$1 line when the line type included in the candidates is the L$\alpha$ line, and is the L$\alpha$ line when the line type included in the candidates is the L$\beta$1 line (Step 3).

When the peak of the line type that forms a pair is confirmed in Step 3, it is determined whether an intensity ratio between the selected line type and the line type that forms a pair therewith is suitable. When it is determined that the intensity ratio is suitable, the peaks included in the fluorescent X-ray spectrum are identified as peaks exhibited by the selected line type and the line type that forms a pair therewith. As a result, an element that causes the peaks is identified (Step 4).

When the peaks are identified in Step 4, it is examined whether a peak exists at an angle at which an incidental line (another line type having a low relative intensity that is emitted from the element identified in Step 4) appears. When such a peak exists, an intensity ratio with respect to the line type having a high intensity, such as the K$\alpha$ line and the L$\alpha$ line, is examined, and it is determined whether the intensity ratio is suitable. When it is determined that the intensity ratio is suitable, the peak included in the fluorescent X-ray spectrum is identified as the incidental line. Further, a peak is also identified for a higher-order line in the same step as that for the incidental line (Step 5).

Step 2 to Step 5 are performed on peaks that have not been identified in Step 2 to Step 5 among the peaks included in the fluorescent X-ray spectrum, to thereby repeatedly perform identification of a peak caused by another element and identification of the element (Step 6).

When a peak that has not been identified in Step 2 to Step 6 remains, it is examined whether fluorescent X-rays of the K$\alpha$, L$\alpha$, and L$\beta$1 lines that appear in the vicinity of the angle of the peak exist, and when such fluorescent X-rays exist, it is identified that the fluorescent X-rays are the K$\alpha$, L$\alpha$, and L$\beta$1 lines for which the peak exists (Step 7).

In an angular region (or energy region) in which a K line of a light element (element up to Ca in the periodic table of elements) appears, peaks of an L line and an M line of a heavy element may also appear. When there is a heavy element having a particularly high X-ray intensity, a peak that appears outside of the angular region is also identified, taking into account a possibility that the L line, the M line, or a higher-order line of a heavy element with a large atomic number may appear in the angular region.

In recent years, the above-mentioned steps have been performed by software. In addition, a user manually examines whether identification results obtained by the software contain an error by following the above-mentioned steps. Some X-ray fluorescence spectrometers assist the user in the above-mentioned steps when the user manually identifies peaks (see Patent Literature 1 below).

CITATION LIST

Patent Literature

[PTL 1] JP 2005-114658 A

SUMMARY OF INVENTION

Technical Problem

Hitherto, when the line type of fluorescent X-rays has been identified for a peak by software, the user examines whether a corresponding identification result is correct. In the software, the following two operation functions are implemented as functions of assisting the user in performing such examination.

One of the functions is a function of displaying, when the user designates an angle (energy in an energy-dispersive X-ray fluorescence spectrometer), a line type, an angle, and a relative intensity of fluorescent X-rays in the vicinity of the designated angle on an operation screen of a computer. The other function is a function of displaying, when the user designates an element, a line type, an angle, and a relative intensity of fluorescent X-rays of the designated element.

In a case where the above-mentioned two functions are used to examine and correct a peak identification result, there is a problem in that an operation of examining the identification result is very complicated when there is a possibility that the peak corresponds to any one of a plurality of line types of fluorescent X-rays.

The present disclosure has been made in view of the above-mentioned problem, and has an object to provide a peak identification analysis program and an X-ray fluorescence spectrometer with which even a person not skilled in X-ray fluorescence analysis can easily perform identification analysis of a fluorescent X-ray spectrum and verification of an analysis result.

Solution to Problem (1) According to one aspect of the present disclosure, there is provided a peak identification analysis program for causing a computer used for an X-ray fluorescence spectrometer to execute: a spectrum acquisition step of acquiring a fluorescent X-ray spectrum including a plurality of peaks; a designated information acquisition step of acquiring an angle or energy designated by a user on the fluorescent X-ray spectrum; a first list display step of displaying a list of one or more elements and line types that are identified based on the designated angle or energy, as a first list which includes candidates of fluorescent X-rays exhibiting the plurality of peaks included in the fluorescent X-ray spectrum; a first list reception step of receiving, from the user, designation of at least some of the one or more elements and line types included in the first list; and a display update step of displaying, in a state where the first list is displayed, while showing that an element and a line type designated in the first list have been designated, a list of the designated element and line type and an angle or energy at which another line type of the designated element appears, as a second list.

(2) In the above-mentioned aspect of the present disclosure, the display update step includes further displaying the element and the line type displayed in the second list at a corresponding position of the fluorescent X-ray spectrum.

(3) In the above-mentioned aspect of the present disclosure, when a plurality of elements and line types are designated in the first list, the designated plurality of elements and line types are displayed on the fluorescent X-ray spectrum in different forms in accordance with an order in which the plurality of elements and line types are designated.

(4) In the above-mentioned aspect of the present disclosure, the displaying of the element and the line type in the display update step is displaying of an element symbol, a line type name, and a vertical line of the designated element.

(5) According to another aspect of the present disclosure, there is provided an X-ray fluorescence spectrometer including: a spectrum acquisition unit configured to acquire a fluorescent X-ray spectrum including a plurality of peaks; a designated information acquisition module configured to acquire an angle or energy designated by a user on the fluorescent X-ray spectrum; a first list display module configured to display a list of one or more elements and line types that are identified based on the designated angle or energy, as a first list which includes candidates of fluorescent X-rays exhibiting the plurality of peaks included in the fluorescent X-ray spectrum; a first list reception module configured to receive, from the user, designation of at least some of the one or more elements and line types included in the first list; and a display update module configured to display, in a state where the first list is displayed, while showing that an element and a line type designated in the first list have been designated, a list of the designated element and line type and an angle or energy at which another line type of the designated element appears, as a second list.

Advantageous Effects of Invention

According to the present disclosure, even a person not skilled in the X-ray fluorescence analysis can easily perform identification analysis of the fluorescent X-ray spectrum and verification of the analysis result.

DESCRIPTION OF EMBODIMENTS

Figure 1:
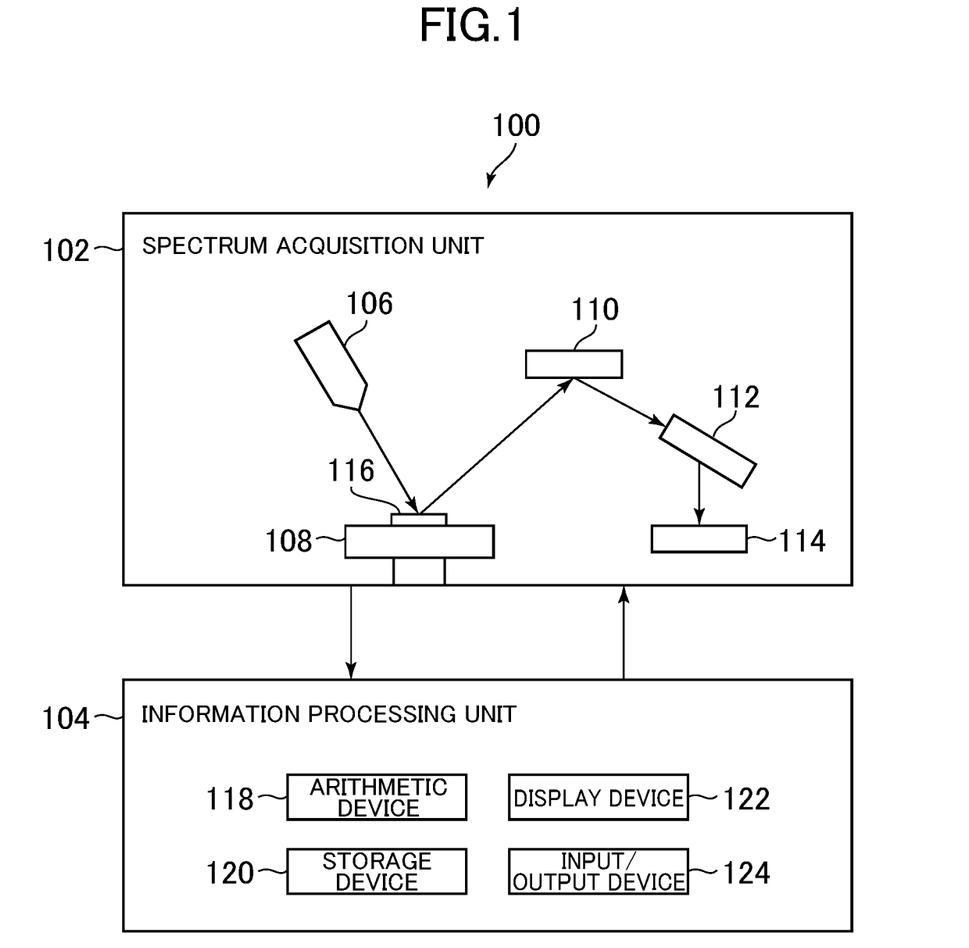
FIG. 1 is a diagram illustrating a schematic example of an X-ray fluorescence spectrometer.

Now, a preferred embodiment for carrying out the present invention (hereinafter referred to as "embodiment") will be described. FIG. 1 is a diagram for illustrating a schematic example n X-ray fluorescence spectrometer 100. As illustrated in FIG. 1, the X-ray fluorescence spectrometer 100 includes a spectrum acquisition unit 102 and an information processing unit 104.

The spectrum acquisition unit 102 acquires a fluorescent X-ray spectrum including a plurality of peaks. Specifically, for example, the spectrum acquisition unit 102 includes an X-ray source 106, a sample stage 108, a spectroscopic device 110, a detector 112, and a counter 114. The spectrum acquisition unit 102 acquires, based on secondary X-rays (fluorescent X-rays or scattered rays) emitted from a sample 116 irradiated with primary X-rays, a spectrum representing a relationship between an intensity and energy of the secondary X-rays.

The sample 116 to be analyzed is placed on the sample stage 108. The X-ray source 106 irradiates a surface of the sample 116 with the primary X-rays. The secondary X-rays are emitted from the sample 116 irradiated with the primary X-rays.

The spectroscopic device 110 disperses the secondary X-rays. Specifically, for example, the spectroscopic device 110 disperses, among the secondary X-rays emitted from the sample 116 and having a plurality of wavelengths, only X-rays having a specific wavelength satisfying the Bragg conditional expression. An incident angle formed by a direction in which the secondary X-rays emitted from the sample 116 travel and a surface of the spectroscopic device 110 is represented by e.

The detector 112 is, for example, a scintillation counter. The detector 112 measures the intensity of the secondary X-rays, and outputs a pulse signal having a pulse height corresponding to measured energy of the secondary X-rays.

The spectroscopic device 110 and the detector 112 are rotated by a goniometer (not shown) while keeping a fixed angular relationship. Specifically, the spectroscopic device 110 is rotated by the goniometer such that the incident angle θ of the secondary X-rays with respect to the surface of the spectroscopic device 110 changes within a predetermined range. The secondary X-rays are diffracted by the spectroscopic device 110, and the secondary X-rays satisfying the Bragg conditional expression (that is, the secondary X-rays having an exit angle θ) are emitted therefrom. The detector 112 is moved by the goniometer to a position where the secondary X-rays emitted from the spectroscopic device 110 at the exit angle θ enter.

The counter 114 counts a pulse signal output from the detector 112 in accordance with the pulse height. Specifically, for example, the counter 114 counts a pulse signal that is output as the intensity measured by the detector 112 in accordance with the pulse height, and outputs a result thereof to the information processing unit 104 as the X-ray intensity. The spectrum acquisition unit 102 acquires the output of the counter 114 as a fluorescent X-ray spectrum (hereinafter also simply referred to as "spectrum").

The information processing unit 104 controls operation of the spectrum acquisition unit 102. Specifically, the information processing unit 104 is a computer connected to the spectrum acquisition unit 102, and includes an arithmetic device 118, a storage device 120, a display device 122, and an input/output device 124.

The arithmetic device 118 is a central processing unit (CPU) being a processor, and performs various types of arithmetic operations. The storage device 120 is a device that can statically record information, such as a random access memory (RAM) being a memory, and a hard disk drive (HDD) or a solid-state drive (SSD). The storage device 120 stores a qualitative analysis program such as a peak identification analysis program. The qualitative analysis program such as the peak identification analysis program is a program to be executed by the information processing unit 104 used for the X-ray fluorescence spectrometer 100. The peak identification analysis program is a program for causing the information processing unit 104 to execute steps included in peak identification analysis described later. The qualitative analysis program is a program for performing qualitative analysis for acquiring information on an element of the sample 116 based on a peak identified by the peak identification analysis program.

The display device 122 is a cathode-ray tube (CRT) display or a so-called flat-panel display, for example, and displays an image. The input/output device 124 is one or more interfaces to be used by a computer to exchange information with an external device, and is one or more devices to be used by a user to input information, for example, a keyboard, a mouse, and a touch panel. The input/output device 124 may also include various types of ports for wired connection and a controller for wireless connection.

The X-ray fluorescence spectrometer 100 illustrated in FIG. 1 is a wavelength-dispersive X-ray fluorescence spectrometer, but the X-ray fluorescence spectrometer 100 may be an energy-dispersive X-ray fluorescence spectrometer. When the X-ray fluorescence spectrometer 100 is the energy-dispersive X-ray fluorescence spectrometer, the spectroscopic device 110 and the goniometer are not included, and a semiconductor detector such as a silicon drift detector (SDD) is used as the detector.

The peak identification analysis program is the program for causing the information processing unit 104 to execute the steps included in the peak identification analysis described later. Specifically, the peak identification analysis program stored in the HDD is read out into the RAM as required to be executed by the CPU. That is, the RAM stores code for implementing various types of functions illustrated in FIG. 2 as functional blocks by being executed by the CPU. The peak identification analysis program may be recorded in a computer-readable information recording medium, such as an optical disc, a magneto-optical disc, or a flash memory, to be provided, or may be provided via I/O through an external information communication line such as the Internet.

Figure 2:
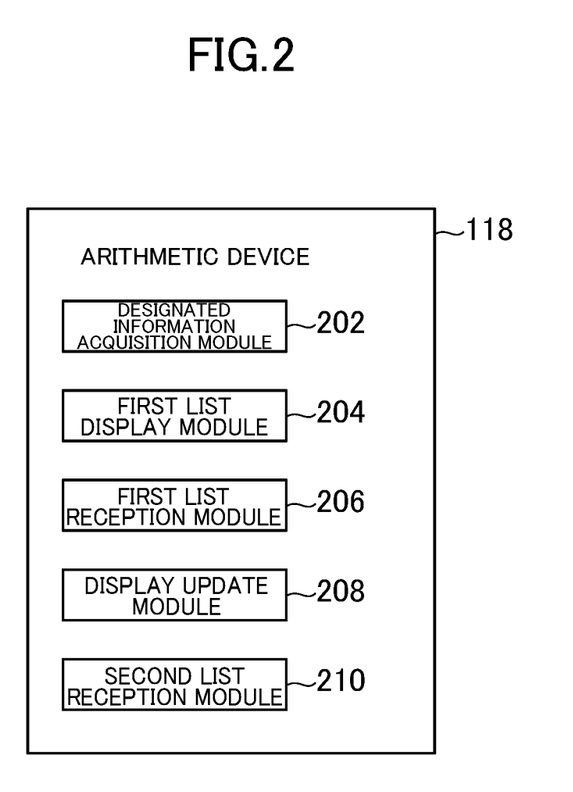
FIG. 2 is a diagram illustrating functional blocks of an arithmetic device.

When the peak identification analysis program is executed by the information processing unit 104, as illustrated in FIG. 2, the arithmetic device 118 functionally includes a designated information acquisition module 202, a first list display module 204, a first list reception module 206, a display update module 208, and a second list reception module 210.

The designated information acquisition module 202 acquires an angle or energy designated by the user on the fluorescent X-ray spectrum. Specifically, for example, a case where the spectrum acquisition unit 102 acquires a spectrum shown in FIG. 3 and the spectrum is displayed on the display device 122 will be described. The user operates the mouse to click a position in the vicinity of a peak desired to be identified (for example, in the vicinity of 34 degrees) of the spectrum shown in FIG. 3. The designated information acquisition module 202 acquires an angle represented by the clicked position of the spectrum shown in FIG. 3 as a designated angle.

Figure 3:
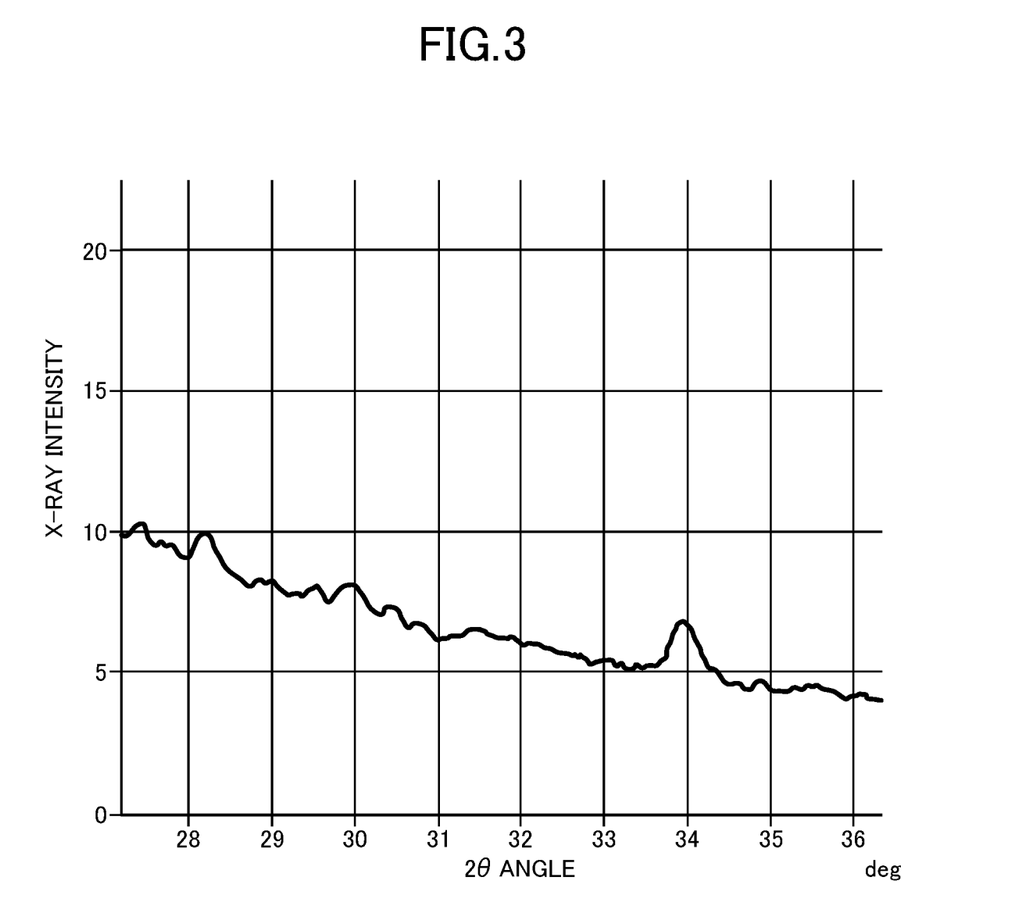
FIG. 3 is a graph showing an example of a fluorescent X-ray spectrum.

The fluorescent X-ray spectrum shown in FIG. 3 is the fluorescent X-ray spectrum acquired by the wavelength-dispersive X-ray fluorescence spectrometer 100, and hence the horizontal axis represents an angle (deg). When the X-ray fluorescence spectrometer 100 is the energy-dispersive X-ray fluorescence spectrometer, the horizontal axis of the fluorescent X-ray spectrum represents energy (keV). In this case, the designated information acquisition module 202 acquires energy designated by the user when the user operates the mouse.

Figure 4:
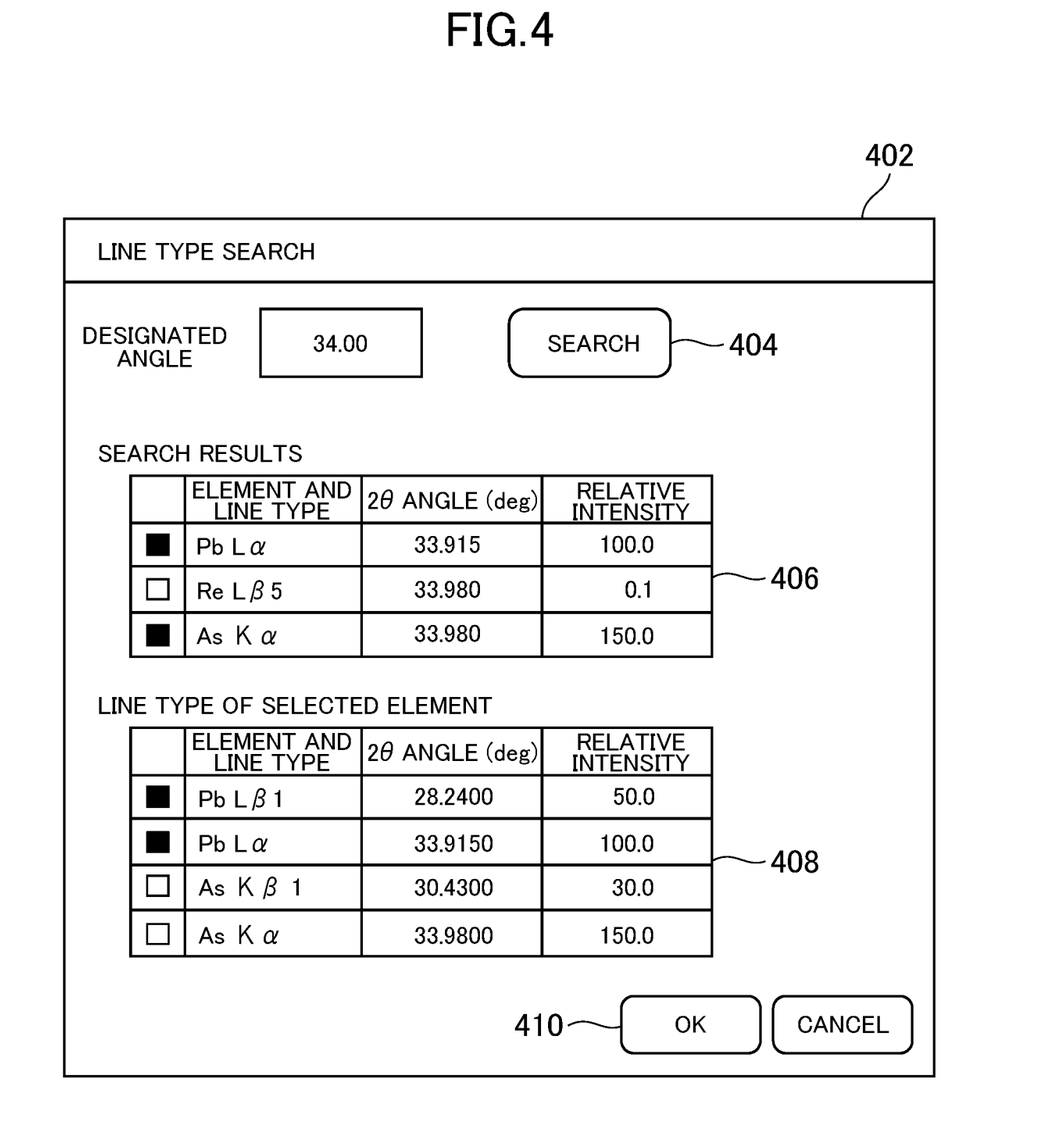
FIG. 4 is a diagram illustrating an example of a line type search image.

The designated information acquisition module 202 may acquire an angle that has been input by the user operating the keyboard as the designated angle. For example, FIG. 4 shows an example of an image (hereinafter referred to as "line type search image 402") displayed on the display device 122 when the peak identification analysis program is executed by the information processing unit 104. The user operates the keyboard to input numerical data of "34.00" to a designated angle field of the line type search image 402. When the user has input the numerical data or when the user has clicked a search button 404, the designated information acquisition module 202 may acquire the input numerical data as the designated angle.

The first list display module 204 displays a list of one or more elements and line types that are identified based on the designated angle or energy, as a first list 406 which includes candidates of fluorescent X-rays exhibiting the peaks included in the fluorescent X-ray spectrum. Specifically, the first list display module 204 searches for fluorescent X-rays existing within a predetermined range before and after the designated angle based on a theoretical energy table, and displays information on candidate fluorescent X-rays. The information on the fluorescent X-rays to be displayed includes an element and a line type, a 2θ angle (deg), and a relative intensity. The table shown in search results of FIG. 4 is an example of the first list 406. The first list 406 includes the following pieces of information: user-designated information in the first column, the element and the line type in the second column, the 2θ angle (deg) in the third column, and the relative intensity in the fourth column.

The user-designated information is information representing whether or not the user designates fluorescent X-rays shown in a corresponding row. For example, the designated information is represented by whether or not a checkbox or a radio button has been checked. The example of FIG. 4 shows a state where checkboxes are displayed on the first column of the first list 406, and checkboxes arranged in rows representing a PbLα line and an AsKα line have been checked.

The user-designated information may be information designating a plurality of candidates of fluorescent X-rays at the same time, or may be information designating only one candidate thereof at one time. For example, when the checkboxes are displayed on the first column of the first list 406 and the checkboxes of a plurality of rows have been turned on as illustrated in FIG. 4, a plurality of candidates of fluorescent X-rays are designated at the same time. Radio buttons may be displayed on the first column of the first list 406, and when a certain row is designated, designation of another row may be canceled. The user-designated information may be represented by, instead of on/off states of checkboxes, a difference in display form (for example, color or font) in the entire row.

The element and the line type of the first list 406 are information specifying the element and the line type of the relevant fluorescent X-rays. For example, when the designated angle of "34.00" has been acquired as described above, the first list display module 204 searches for fluorescent X-rays that theoretically appear within 0.1 degree before and after 34.00 degrees, and displays elements and line types of "PbLα," "ReLβ5," and "AsKα" as elements and line types specifying the retrieved fluorescent X-rays. The displayed elements and line types are all candidates of the fluorescent X-rays exhibiting the peaks.

The 2θ angle (deg) of the first list 406 is a theoretical value of the 2θ angle at which the candidate fluorescent X-rays appear. For example, in the above-mentioned case, numerical values of "33.915," "33.980," and "33.980" are displayed as the 2θ angle of "PbLα," the 2θ angle of "ReLβ5," and the 2θ angle of "AsKα," respectively.

The relative intensity of the first list 406 is a numerical value representing an intensity ratio between the types of fluorescent X-rays displayed as the candidates. For example, in the above-mentioned case, numerical values of "0.1" and "150.0" are displayed as the relative intensity of "ReLβ5" and the relative intensity of "AsKα," respectively, with the relative intensity of "PbLα" being set to "100.0" as a reference.

Each of the line types displayed in the first list 406 is not required to be the line type having the highest intensity in the same series (for example, the same element and the same L-series line type), and may be an incidental line such as an Lβ2 line or Lγ1, or a higher-order line.

The first list reception module 206 receives, from the user, designation of at least some of the one or more elements and line types included in the first list 406. Specifically, for example, the user operates the mouse to turn the checkboxes displayed in the first column of the first list 406 on or off. The first list reception module 206 receives an element and a line type of the row in which a checked checkbox is displayed as an element and a line type designated by the user.

The display update module 208 displays, in a state where the first list 406 is displayed, while showing that the element and the line type designated in the first list 406 have been designated, a list of the designated element and line type and an angle or energy at which another line type of the element appears, as a second list 408. Specifically, when the user selects the checkbox of the element and the line type of the first list 406, the display update module 208 displays a list of line types of the designated element as the second list 408.

For example, the second list 408 includes user-designated information, an element and a line type, and a 2θ angle and a relative intensity thereof. Specifically, the second list 408 includes, in the same manner as the first list 406, the following pieces of information: the user-designated information in the first column, the element and the line type in the second column, the 2θ angle (deg) in the third column, and the relative intensity in the fourth column. In the second list 408 of FIG. 4, the elements and the line types of "PbLα" and "PbLβ1" and the elements and the line types of "AsKα" and "AsKβ1" are displayed as the line types of "Pb" and the line types of "As," respectively.

In the row of "PbLβ1" of the second list 408, "28.2400" and "50.0" are displayed as the 2θ angle and the relative intensity, respectively. In the row of "PbLα" of the second list 408, the same information as that of the first list 406 is displayed. In the row of "AsKβ1" of the second list 408, "30.4300" and "30.0" are displayed as the 2θ angle and the relative intensity, respectively. In the row of "AsKα" of the second list 408, the same information as that of the first list 406 is displayed. Each of the 2θ angles and each of the relative intensities are all theoretical values. For the relative intensity, there may be an error in the theoretical value because of, for example, energy dependence of an analyzing crystal, and hence an experimental value or a theoretical value may be corrected based on an actually measured value.

The display update module 208 further displays the element and a line type name at a corresponding position of the fluorescent X-ray spectrum. For example, when the checkboxes arranged in the rows representing "PbLα" and "AsKα" of the first list 406 are checked, while displaying a list of the elements and the line types of Pb and As, which are the designated elements, angles or energy at which the elements and the line types appear, and the relative intensity as the second list 408, the display update module 208 displays, on the spectrum shown in FIG. 3, the PbLα line, the PbLβ1 line, the AsKα line, and the AsKβ1 line at positions of theoretical angles of the respective types of fluorescent X-rays. For example, the displaying of the element and the line type is displaying of an element symbol, the line type name, and a vertical line of the designated element. As illustrated in the line types of the selected elements of the line type search image of FIG. 4, the second list 408 may be a list in which a plurality of elements are continuously displayed, or may be a list in which the line types are individually displayed for each element.

Figure 5:
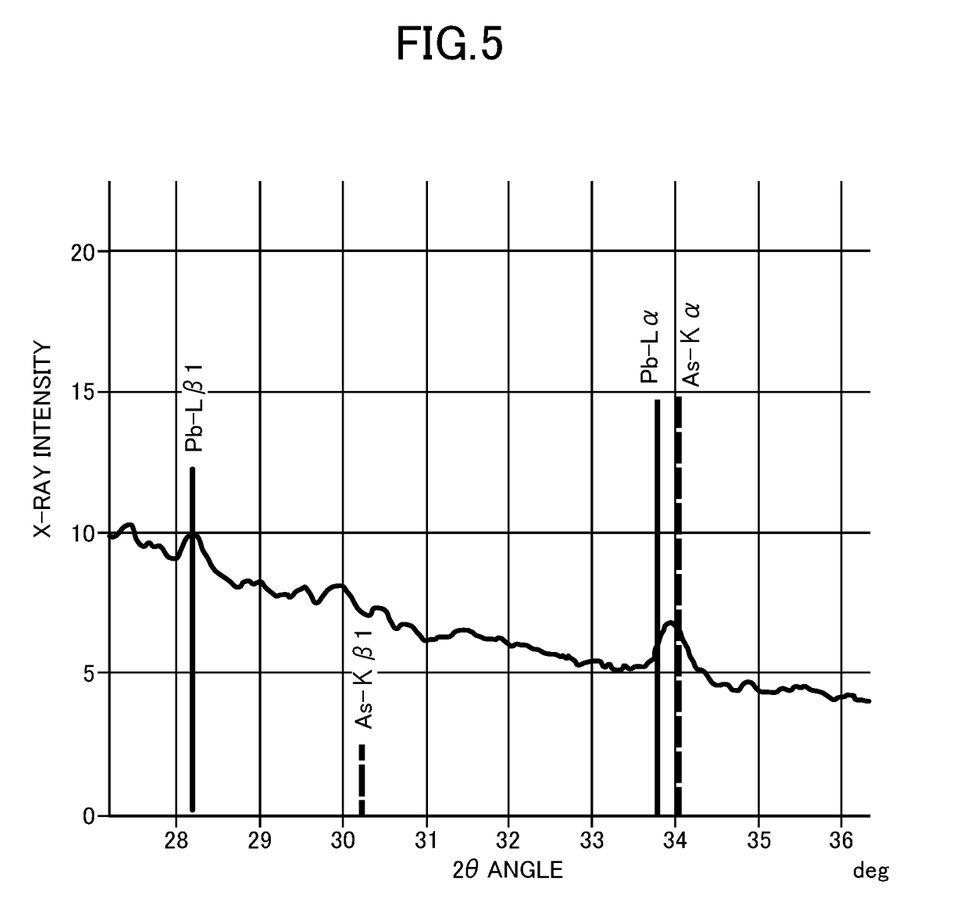
FIG. 5 is a graph showing an example of the fluorescent X-ray spectrum in a state where elements and line types are displayed.

When a plurality of elements and line types are designated in the first list 406, the designated elements and line types may be displayed on the fluorescent X-ray spectrum in different forms in accordance with an order in which those elements and line types are designated. For example, the designated elements and line types may be displayed in forms of lines that differ for each element such that, when "PbLα" is designated first and "AsKα" is subsequently designated, the vertical lines representing "PbLα" and "PbLβ1," which are the line types of Pb, are displayed as solid lines, and the vertical lines representing "AsKα" and "AsKβ1," which are the line types of As, are displayed as broken lines. FIG. 5 is a graph showing a state where the elements and the line types of the above-mentioned four types of fluorescent X-rays are displayed on the acquired fluorescent X-ray spectrum. The different forms may be expressed by difference in color instead of solid lines and broken lines.

In response to switching of the user's designation of the element and the line type of the first list 406, the display update module 208 switches whether or not the designated element and line type is to be displayed at a corresponding position of the fluorescent X-ray spectrum. For example, when the designation of "AsKα" is canceled, the rows of AsKα and AsKβ1 included in the second list 408, and the corresponding element symbols, line type names, and vertical lines of the AsKα line and AsKβ1 of the fluorescent X-ray spectrum are hidden.

In the state where the first list 406 is displayed and the element and the line type designated in the first list 406 have been designated, the second list reception module 210 receives designation of at least some of the one or more elements and line types included in the second list 408 from the user. This is for identifying, based on the element symbol and the line type name displayed at the corresponding position of the fluorescent X-ray spectrum of each element and line type included in the second list 408 and on the relative intensity, an element included in an actual sample and selecting the element and the line type to be identified.

Specifically, as illustrated in FIG. 4, it is shown that the first list 406 is displayed and the checkboxes of the same rows as those of "PbLα" and "AsKα" designated in the first list 406 have been turned on. In this state, the user operates the mouse to turn the checkboxes shown in the first column of the second list 408 on or off. The second list reception module 210 receives the fluorescent X-rays shown in the row in which the checked checkbox is displayed as the element and the line type designated by the user.

Figure 6:
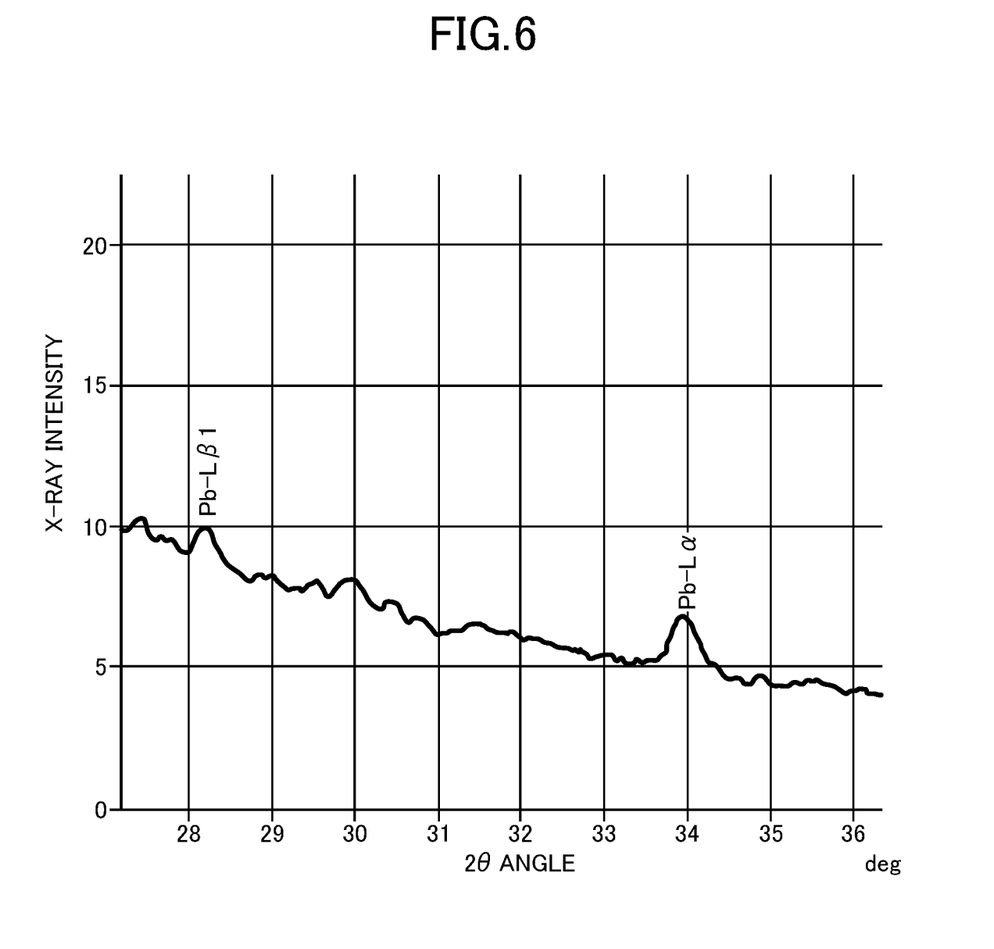
FIG. 6 is a graph showing an example of the fluorescent X-ray spectrum in a state where peaks have been identified.

In FIG. 4, it is shown that the checkboxes of the same rows as those of "PbLα" and "PbLβ1" designated in the second list 408 have been turned on. This is because, based on the element symbol and the line type name displayed at the position of the fluorescent X-ray spectrum of each element and line type included in the second list 408 and on the relative intensity, the user determines that the sample contains Pb and identifies that the peaks included in the fluorescent X-ray spectrum correspond to the "PbLα" and "PbLβ1" lines. In this state, when an OK button 410 of the line type search image of FIG. 4 is clicked, as shown in FIG. 6, the display update module 208 displays the element symbols and the line type names of the selected "PbLα" and "PbLβ1" on the acquired fluorescent X-ray spectrum. Identification by the peak identification analysis program is thus performed.

When a plurality of elements and line types are designated in the first list 406, the display update module 208 may display an individual second list 408 for each of the designated elements. Specifically, for example, although one second list 408 including four types of elements and line types of "PbLα," "AsKα," "PbLβ1," and "AsKβ1" is displayed in FIG. 4, the second list 408 including "PbLα" and "PbLβ1" and the second list 408 including "AsKα" and "AsKβ1" may be individually displayed.

The line type to be displayed in the second list 408 is not required to be the line type having a high intensity caused by the designated element, and may be an incidental line such as the Lβ2 line or Lγ1 or a higher-order line.

Figure 7:
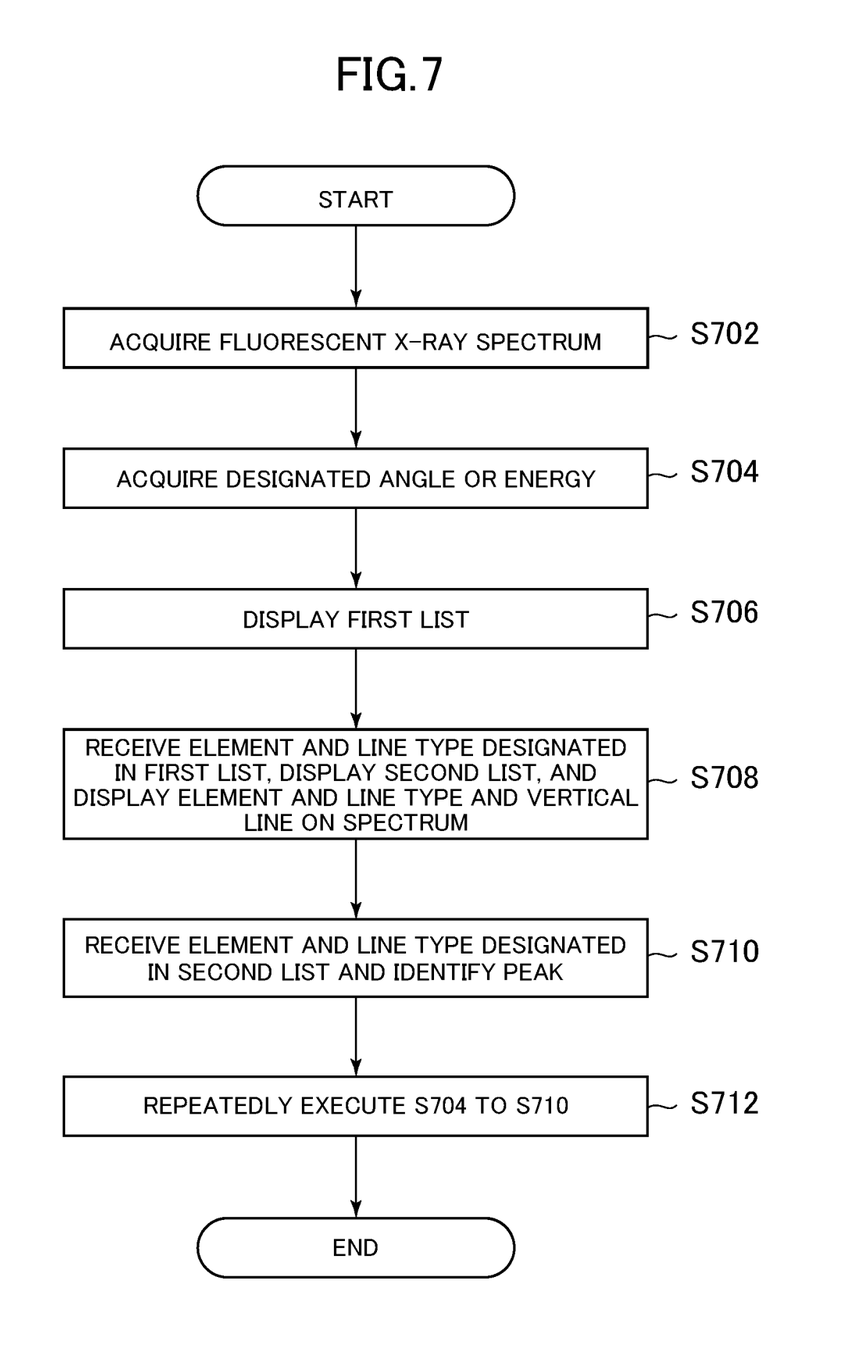
FIG. 7 is an example of a flowchart of peak identification analysis.

Next, the steps included in peak identification analysis which the peak identification analysis program causes the information processing unit 104 to execute will be described with reference to FIG. 7.

First, the spectrum acquisition unit 102 acquires a fluorescent X-ray spectrum including a plurality of peaks (Step S702). The acquired fluorescent X-ray spectrum is displayed on the display device 122 (see FIG. 3). Further, the line type search image 402 illustrated in FIG. 4 is displayed on the display device 122. At this time point, the first list 406 and the second list 408 are not displayed in the line type search image 402.

Subsequently, the designated information acquisition module 202 acquires an angle or energy designated by the user on the fluorescent X-ray spectrum (Step S704). For example, the user operates the mouse to click a position in the vicinity of a peak desired to be identified of the spectrum shown in FIG. 3, and as a result, the designated information acquisition module 202 acquires the designated angle of 34 degrees. The acquired designated angle is displayed in the designated angle field of the line type search image 402 illustrated in FIG. 4.

Subsequently, the first list display module 204 displays, based on the designated angle or energy, a list of one or more elements and line types existing within a predetermined range before and after the designated angle, as the first list 406 which includes candidates of the fluorescent X-rays exhibiting the peaks included in the fluorescent X-ray spectrum (Step S706). For example, when the user clicks the search button 404, the first list display module 204 displays the first list 406 including "PbLα," "ReLβ5," and "AsKα" illustrated in FIG. 4. At this time point, the second list 408 is not displayed in the line type search image 402.

Subsequently, the first list reception module 206 receives, from the user, designation of at least some of the one or more elements and line types included in the first list 406. Further, the display update module 208 displays, for the element of the element and the line type designated for the first list reception module 206, a list of the corresponding elements and the corresponding line types in the second list 408. Specifically, in the state where the first list 406 is displayed, while showing that the element and the line type designated in the first list 406 have been designated, the display update module 208 displays a list of the designated element and an angle or energy at which the line type of the element appears, as the second list 408. Moreover, the display update module 208 displays the element and the line type designated in the second list 408 at a corresponding position of the fluorescent X-ray spectrum (Step S708).

Specifically, for example, the user operates the mouse to turn on the checkboxes of "PbLα" and "AsKα" of the first list 406. The first list reception module 206 receives "PbLα" and "AsKα" as the designated elements and line types. Of the elements and the line types designated for the first list reception module 206, the elements are Pb and As, and hence the display update module 208 displays "PbLβ1," "PbLα," "AsKα," and "AsKβ1" in the second list 408 as the elements and the line types. Moreover, the display update module 208 displays the element symbols of Pb and As and the respective line type names of the elements displayed in the second list 408 at positions of theoretical angles of the respective types of fluorescent X-rays of the fluorescent X-ray spectrum.

Subsequently, the user examines the fluorescent X-ray spectrum and the position and the relative intensity of the line type of each of the types of fluorescent X-rays displayed thereon to identify an element and a line type, and turns on the checkbox of the identified element and line type. In this manner, the second list reception module 210 receives, from the user, designation of at least some of the one or more elements and line types included in the second list 408. Under this state, for example, the user clicks the OK button 410 of the line type search image 402. As a result of this operation, on the fluorescent X-ray spectrum, the element symbol and the line type name of the element and the line type designated in the second list 408 are displayed at a corresponding position. Specifically, it is assumed that the user has identified that the peaks of the PbLβ1 line and the PbLα line exist in the fluorescent X-ray spectrum and turns on the checkboxes of the identified PbLβ1 and PbLα. In this case, the second list reception module 210 receives designation of "PbLβ1" and "PbLα." Then, when the user clicks the OK button 410 of the line type search image of FIG. 4, as shown in FIG. 6, the display update module 208 displays "PbLβ1" and "PbLα" at corresponding positions on the fluorescent X-ray spectrum, and it is thus identified that the peaks of the positions are caused by Pb (Step S710).

Subsequently, Step S704 to Step S710 are repeatedly executed (Step S712). Specifically, the user compares, for each peak to be identified of the fluorescent X-ray spectrum, the position of the peak included in the spectrum and the position at which the designated element and line type are displayed, to thereby determine the element and the line type of the peak to appropriately identify the peak.

With the steps described above, in the state where the first list 406 and the second list 408 are displayed, while it is shown that the element and the line type designated in the first list 406 have been designated, the user can compare an angle at which the peak included in the spectrum appears and a theoretical angle (or energy) of the designated element. Moreover, in the state where the first list 406 and the second list 408 are displayed, the user can make such comparison for each element while switching the element. Thus, even a person not skilled in the X-ray fluorescence analysis can easily perform identification analysis of the fluorescent X-ray spectrum and verification of the analysis result.

In the following, as a comparative example, an example of operation steps in a related-art method will be described while being compared with the present disclosure. Even in the related-art method, the steps of Step S702 to Step S706 in the present disclosure are executed. That is, when such a fluorescent X-ray spectrum as shown in FIG. 3 is acquired and a peak in the vicinity of 34 degrees is to be identified, such candidates of elements and line types as shown in FIG. 8 are displayed together with theoretical angles and relative intensities thereof.

Figure 8:
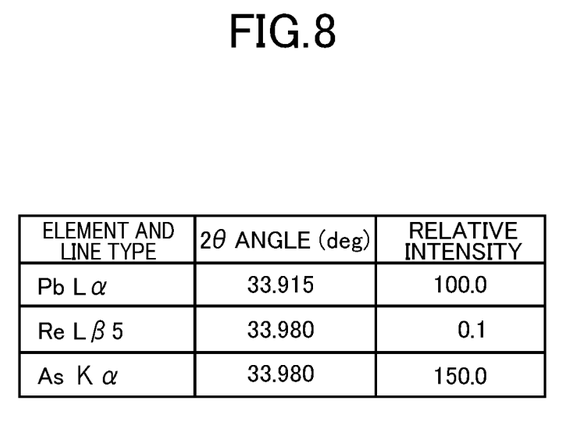
FIG. 8 is a table showing a list of candidates of elements and line types in a related-art example.
Figure 9:
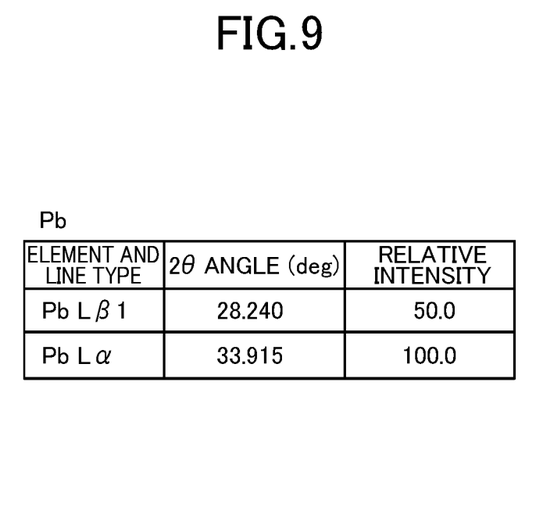
FIG. 9 is a table showing a list of line types of Pb displayed in the related-art example.

At a time point when the candidates shown in FIG. 8 are displayed, it is unknown which element and which line type the peak in the vicinity of 34 degrees corresponds to, and hence the user determines, for each element given as a candidate, whether or not the element is contained in the sample 116 by referring to the fluorescent X-ray spectrum. Specifically, when the user closes an image of line type candidates of FIG. 8, displays an image showing a list of elements and line types of a designated element, and designates Pb out of the candidates shown in FIG. 8, a list of line types of Pb shown in FIG. 9 is displayed. In FIG. 9, PbLβ1 and PBLα, 33.915 degrees and 28.240 degrees, and 50.0 and 100.0 are displayed as line types, 2θ angles, and relative intensities, respectively. Then, the user determines whether, in the fluorescent X-ray spectrum shown in FIG. 3, peaks exist at both positions of 33.915 degrees and 28.240 degrees, being the 2θ angles displayed in FIG. 9. In the example shown in FIG. 3, peaks exist at both positions of 33.915 degrees and 28.240 degrees, and the intensity ratio of the peaks matches the intensity ratio shown in FIG. 9. The user can thus determine that the sample 116 contains Pb and the peaks appearing at the positions of 33.915 degrees and 28.240 degrees are caused by Pb. However, there is a possibility that the peak in the vicinity of 34 degrees is a peak where peaks of the PbLα line and the AsKα line overlap with each other. Accordingly, the user cannot determine at this time point whether or not As and Re are contained in the sample 116.

Figure 10:
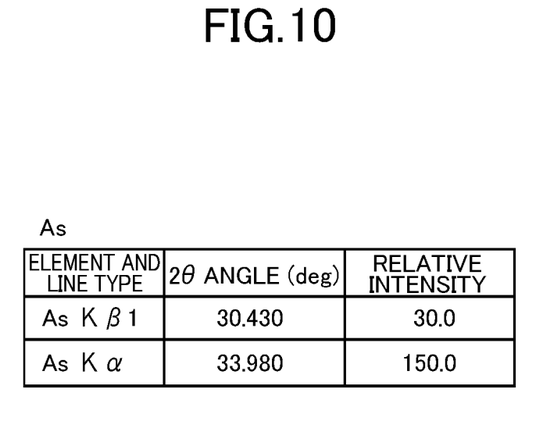
FIG. 10 is a table showing a list of line types of As displayed in the related-art example.

Thus, the user erases the displayed list of line types of Pb shown in FIG. 9. Then, when the user displays the candidates shown in FIG. 8 again and then erases the image of FIG. 8, and displays again an image showing a list of elements and line types of the designated element to designate As, a list of line types of As shown in FIG. 10 is displayed. The list of line types of As includes AsKβ1 and AsLα, 30.430 degrees and 33.980 degrees as 2θ angles, and 30.0 and 150.0 as relative intensities. The user then determines whether, in the fluorescent X-ray spectrum shown in FIG. 3, peaks exist at both positions of 30.430 degrees and 33.980 degrees, being the 2θ angles displayed in FIG. 10. In the example shown in FIG. 3, a peak does not exist in the vicinity of 30.430 degrees. Accordingly, the user determines that the sample 116 does not contain As. The user performs a similar operation also for Re to determine that Re is not contained in the sample 116. As a result, the user identifies that the peaks appearing at the positions of 33.915 degrees and 28.240 degrees correspond to the PbLβ1 and PbLα lines.

As described above, in the related art, it is required to repeatedly display and hide a list of line types for each element. In the related art described above, the case where only two types of lists are displayed as lists of line types of As and Pb has been described, but when presence or absence of a larger number of line types is to be examined or when peaks of a plurality of elements overlap with each other, it is required to repeatedly execute designation of an angle and an element a large number of times, and hence the operation is very complicated. According to the present disclosure, as described above, in the state where the first list 406 and the second list 408 are displayed, while it is shown that the element and the line type designated in the first list 406 have been designated, the angle at which the peak included in the spectrum appears and the theoretical angle (or energy) of the designated element and the intensity ratio between the line types can be compared. Thus, the user can easily perform identification analysis and verification of the analysis result.

The present disclosure can be variously modified without being limited to the above-mentioned embodiment. The configuration of the above-mentioned X-ray fluorescence spectrometer 100 is described as one example, and the present disclosure is not limited thereto. The configuration described in the above-mentioned embodiment may be replaced by a configuration that is substantially the as the same configuration described in the above-mentioned embodiment, a configuration that exhibits the same action and effect as those of the configuration described in the above-mentioned embodiment, or a configuration that achieves the same object as that of the configuration described in the above-mentioned embodiment.

REFERENCE SIGNS LIST

100 X-ray fluorescence spectrometer, 102 spectrum acquisition unit, 104 information processing unit, 106 X-ray source, 108 sample stage, 110 spectroscopic device, 112 detector, 114 counter, 116 sample, 118 arithmetic device, 120 storage device, 122 display device, 124 input/output device, 202 designated information acquisition module, 204 first list display module, 206 first list reception module, 208 display update module, 210 second list reception module, 402 line type search image, 404 search button, 406 first list, 408 second list, 410 OK button

The invention claimed is:

1. A non-transitory computer-readable information storage medium storing a peak identification analysis program to be executed by a computer used for processing an X-ray fluorescence spectrometer data, comprising steps:

irradiating, from a spectrum acquisition step of causing the X-ray fluorescence spectrometer, a sample and acquiring a fluorescent X-ray spectrum including a plurality of peaks from the irradiated sample;

acquiring, from a designated information acquisition step, an angle or energy designated by a user on the fluorescent X-ray spectrum;

displaying, from a first list display step, a first list of one or more elements and line types that are identified based on the designated angle or energy, wherein the first list is displayed in a table format and includes candidates of fluorescent X-rays exhibiting the plurality of peaks included in the fluorescent X-ray spectrum;

receiving, a first list reception step from the user, designation of at least one or more elements and line types included in the first list;

displaying, from a display update step, a second list in the table format, the second list comprising candidates of fluorescent X-rays of the designated element and line type and an angle or energy at which another line type of the designated element appears in a state where the first list is displayed while showing the element and the line type designated in the first list have been designated; and in the display update step, when the designation of the element and line type designated in the first list is canceled, the canceled element and line type shall be hidden in the second list and in the fluorescent X-ray spectrum.

2. The non-transitory computer-readable information storage medium according to claim 1, wherein the display update step further displaying the element and the line type displayed in the second list at a corresponding position of the fluorescent X-ray spectrum.

3. The non-transitory computer-readable information storage medium according to claim 2, wherein the displaying of the element and the line type in the display update step is displaying of an element symbol, a line type name, and a vertical line of the designated element.

4. The non-transitory computer-readable information storage medium according to claim 1, wherein, when a plurality of elements and line types are designated in the first list, the designated plurality of elements and line types are displayed on the fluorescent X-ray spectrum in different forms in accordance with an order in which the plurality of elements and line types are designated.

5. The non-transitory computer-readable information storage medium according to claim 1, wherein the first list comprises a user designation information column where the user can designate the one or more elements and line types.

6. The non-transitory computer-readable information storage medium according to claim 1, wherein the first list display step comprises displaying a designated angle field wherein the designated angle or energy is displayed.

7. An X-ray fluorescence spectrometer, comprising:

a computer connected to a spectrum acquisition unit, the computer comprising: an arithmetic device, storage, a display and an input/output device, and the spectrum acquisition unit configured to irradiate a sample and acquire a fluorescent X-ray spectrum including a plurality of peaks from the irradiated sample;

the computer being configured to:

acquire an angle or energy designated by a user on the fluorescent X-ray spectrum;

display a first list of one or more elements and line types that are identified based on the designated angle or energy, wherein the first list is displayed in a table format and includes candidates of fluorescent X-rays exhibiting the plurality of peaks included in the fluorescent X-ray spectrum;

receive, from the user, designation of at least one or more elements and line types included in the first list;

display a second list in the table format, the second list comprising candidates of fluorescent X-rays of the designated element and line type and an angle or energy at which another line type of the designated element appears in a state where the first list is displayed while the element and the line type designated in the first list have been designated; and in the displaying of the second list, when the designation of the element and line type designated in the first list is canceled, the canceled element and line type shall be hidden in the second list and in the fluorescent X-ray spectrum.

* * * * *